Jan. 11, 1955  F. B. SYLVANDER  2,699,539
DIRECTION INDICATOR
Filed Aug. 31, 1953
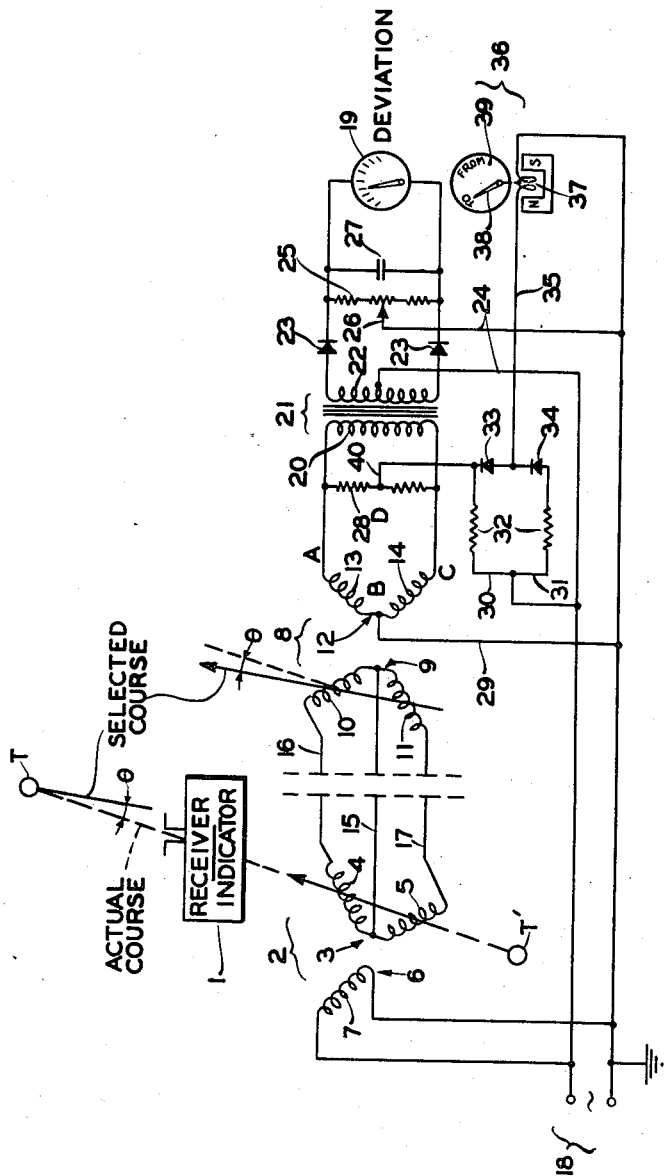
INVENTOR
FREDERICK B. SYLVANDER
BY Geo. G. Hyde
ATTORNEY

United States Patent Office 2,699,539
Patented Jan. 11, 1955

2,699,539

DIRECTION INDICATOR

Frederick B. Sylvander, Ridgewood, N. J., assignor to Bendix Aviation Corporation, Teterboro, N. J., a corporation of Delaware Application August 31, 1953, Serial No. 377,354

14 Claims. (Cl. 340—268)

This invention relates to electrical signal systems, and particularly to a system employing resolvers in a circuit from which two separate but related phase-offset signals may be derived from the same source. It is adapted for use in known signal systems, such as direction indicator systems employed on aircraft, in which a radio signal from a ground transmitter is automatically translated into an indication of the direction of the transmitter from the plane, compared with a course to a destination that has been selected, and deviations from such course are automatically shown on an indicator.

In systems of this type it is desirable to provide also an indication of whether the craft is approaching or departing from the destination, serving to notify the pilot when he has passed over the destination in blind flying, since the course deviation indicator is ambiguous on this point, the arrangements employed to provide this indication being generally referred to as ambiguity indicators. A general purpose of the invention is to provide a novel, improved ambiguity indicator system that is simple and positive in action. A further purpose is to provide such an arrangement that is readily coordinated with a deviation indicating system.

A feature of the invention is the use of resolvers in an indicating system or the like, both to transmit and to receive directional signals used in indicating course deviations and for other purposes, and also to create ambiguity indicator signals. In accomplishing this object, advantage is taken of the fact that when the aircraft passes over the transmitting station, the received signals are shifted 180° in phase; and an object of the invention is to utilize this phase shift in a resolver circuit to identify the direction of the station along the course line. This is in general accomplished by a novel resolver circuit which takes advantage of the fact that the sum of the voltages across two resolver windings is electrically offset 90° from their difference. For instance, when the sum voltage is at its positive maximum, the difference voltage will be zero; and when, a quarter cycle later, the sum voltage is zero, the difference voltage will be at its negative maximum. A feature of the invention is the utilization of this fact to provide both deviation and ambiguity signals from the same resolver circuit.

In its broader aspects, however, the invention is not limited to the specific use indicated, though it is especially advantageous in that field. It includes a resolver system in which a first output circuit carries the difference of the voltages across the two resolver windings, and a second output circuit carries their sum. The two outputs will be effectively 90° apart, as noted, for any position of the resolver rotor. This rotor will of course have two positions, 180° apart, for each output circuit, known as null positions, in which the output will be zero; and in the arrangement indicated, the null positions of the rotor for the two output circuits will be at right angles to each other.

This relationship can be utilized in various ways, one of which has been set forth. A further object is to utilize the described resolver arrangement for the simultaneous production of two signals; one, across the first output circuit, will correspond to the angular position of the resolver rotor relative to the null position for that circuit; the other, across the second output circuit, will show which of the two first circuit null positions is closer.

An additional purpose is to provide an effective means for translating the second output circuit signals into direct current signals whose polarity will indicate which of the two first circuit null positions is closer. This is in general accomplished by providing a reference circuit energized by alternating current, to which the second circuit output is connected; and the resultant algebraic sum of the two currents is rectified, producing a direct current whose polarity corresponds to the direction in which the null position of the first circuit is closer.

In general, the invention thus includes a rotary transformer having a stator and a rotor, one of which is energized by alternating current, the other having two windings at right angles, and two output circuits, one connected across the two windings in series, the other in parallel, in which case the voltages in said circuits will be in quadrature. This may be utilized in various ways. The voltages may be rectified, with the D. C. output of one circuit operating a voltage-sensitive device, such as a deviation meter, the D. C. output of the other circuit actuating a phase or polarity sensitive device, such as an ambiguity meter.

These and other objects, features and advantages of the invention will appear more fully hereafter from the detailed description which follows, considered in conjunction with the accompanying drawing, which is a circuit diagram of one embodiment of the invention. It is to be expressly understood, however, that this is for the purpose of illustration and description, and is not to be construed as defining the limits of the invention.

In the form illustrated, the invention is applied to a direction indicating system of the type used in aircraft, in which a signal from a ground transmitter T is picked up by a receiver 1 which positions the rotor of a synchro in accordance with the direction of the signal. Direction indicating apparatus of this type is well known, being disclosed for example in the booklet entitled "NA-3 VHF Omni-Directional Navigational System—Part 2—Radio Technical," published in 1947 by Bendix Radio Division of Bendix Aviation Corporation, Baltimore, Maryland, copyright 1947 by Bendix Aviation Corporation, and therefore is not described in detail.

In the embodiment shown in the drawing, the synchro is a resolver 2 having a rotor 3 with windings 4 and 5 at right angles to each other, and a stator 6 having a winding 7. The angular position of rotor 3 will correspond to the direction of the line between the receiver 1 and the transmitter T, as already indicated.

Located at any desired point, and normally at a considerable distance from resolver 2, is a second resolver 8 having a rotor 9 with windings 10 and 11 at right angles to each other, and a stator 12 with windings 13 and 14 at right angles to each other. The rotors 3 and 9 of the two resolvers are connected "back to back"; that is, the connected ends of windings 4 and 5 are joined to the connected ends of windings 10 and 11 by lead 15; the other end of winding 4 is connected to the other end of winding 10 by lead 16, and corresponding ends of windings 5 and 11 are joined by lead 17. Winding 7 of the first resolver is connected across a source 18 of alternating current in the usual manner; and the voltages induced across windings 4 and 5, whose values will depend upon the angular position of rotor 3, will be impressed across windings 10 and 11 of rotor 9 of the second resolver 8.

In the embodiment described, rotor 9 is positioned to correspond to the course which has been selected to the destination marked by transmitter T. The voltages across rotor 9 of the second resolver 8 will of course induce voltages in the windings 13, 14 of stator 12, depending partly upon the voltages impressed by the first resolver rotor 3 and partly upon the angular position of rotor 9. If the latter is the same as that of rotor 3, the voltages across stator windings 13 and 14 will balance, in accordance with the well-known operation of such resolvers, so that the voltage between points A and C at the outer unconnected ends of the latter windings will be zero. If, however, there is a difference between the angular positions of the two rotors, indicated by the angle θ, showing that the actual direction to the transmitter T as indicated by rotor 3 is different from the desired direction indicated by rotor 9, a corresponding voltage will appear across points A and C, whose phase will depend upon whether the deviation $\theta$ is to the right or left, and whose amplitude will correspond to the size of said angle.

This phase relationship may be utilized in known manner, one method being to operate an indicator showing the extent and direction of such deviation. In the form illustrated, the indicating means is in the form of a deviation indicator 19 of the voltmeter type, having a central zero position. The phase difference between points A and C is combined with a reference current from source 18, rectified and applied to indicator 19. In the illustrated circuit points A and C are connected across the primary 20 of a transformer 21, the ends of whose secondary 22 are connected through rectifiers 23 across indicator 19. The A. C. source 18 is connected by leads 24 to a central point of secondary 22 and a central point in an impedance such as resistance 25, extending across the indicator circuit and desirably having an adjustable connection 26 with said A. C. source to assure the correct zero reading of indicator 19 when the voltages from the rectifiers 23 are equal. A condenser 27 may be shunted across the indicator 19 to provide a bypass for any A. C. components. Transformer 21 is advantageously provided to isolate the D. C. rectifier voltages from the windings of stator 12, and to provide the proper signal voltage level.

A second output circuit from the stator 12 is provided, extending from point B where the other ends of windings 13 and 14 are connected to each other, to a terminal point intermediate in voltage between points A and C. The latter terminal is provided in the illustrated embodiment by an impedance, such as resistor 28, shunted across points A and C, the second circuit being connected to resistor 28 at the point D, which advantageously is the midpoint of the latter resistor. With this circuit arrangement it will be apparent that the voltage across AC will be the voltage AB combined with the voltage BC; and as the voltages when taken in this direction will be opposite in phase, the voltage across AC will be the difference between the voltages across windings 13 and 14. Correspondingly, the voltage across BD will be the voltage AB combined with the voltage CB; and as the voltages when taken in this direction will have the same phase, the voltage across BD will be the sum of the voltages across windings 13 and 14. The voltage across AC will be offset 90° from the voltage across BD; so when the voltage across one of these circuits is zero, or a null, the voltage across the other circuit will be a maximum. Voltages having this relationship may be described as in quadrature.

In order to utilize this arrangement, the voltage across BD is applied to a circuit carrying the line voltage from source 18 in such manner that the resultant phases will be unbalanced, the direction of unbalance depending upon the phase angle of the voltage BD. The resultant voltage waves are rectified and applied to a polarity responsive device.

The phase of the voltage across BD will depend upon the phasing in the windings of rotor 3; and this phasing will depend upon the direction from which signals are received by the receiver 1. If the aircraft passes over the transmitter T, signals will then be received from the direction of a transmitter in the position indicated at T'; and this will of course reverse the phases in windings 4 and 5, resulting in a reversal of the phase between points B and D and the polarity of the output of the rectifier system.

In the specific circuit shown, point B is connected to one side of source 18 through lead 29. The other side of the source is connected to parallel leads 30 and 31, each connected through a resistor 32 and a rectifier 33, 34 to the indicator lead 35 extending to indicator 36, the other side of which is connected to source 18 and through lead 29 to point B. In the embodiment illustrated, the indicator 36 includes a galvanometer type meter movement 37 operating a pointer 38 on dial 39 marked to show whether the aircraft is traveling to or from the source of the signal. The point D is connected through lead 40 to lead 30 between resistor 32 and rectifier 33, which is connected in the opposite sense from rectifier 34 in the reference circuit from source 18.

With this circuit arrangement the current from source 18 will pass through rectifiers 33 and 34, each passing one-half of the cycle; and these half cycle D. C. pulses have no effect on the meter movement 37. However, when there is a voltage across BD, the D. C. current in the BD output circuit will pass mainly through rectifier 33, where it is combined with the phase from the source 18 that is passed by rectifier 33, and will either increase or decrease the voltage in such phase, depending on the phase angle, which in turn is dependent on the side from which the radio signal reaches the receiver 1. The polarity of the voltage applied to indicator 36 is therefore determined by such direction, and will operate a polarity-responsive device, such as the meter arrangement above described. It is noted that indicator 36 will operate at all times except when there is a null across BD, which occurs only when the aircraft is 90° off course, in which event pointer 38 will assume a central position.

Although only one embodiment has been illustrated and described in detail, it is to be expressly understood that the invention is not limited thereto. Various changes can be made in the design, arrangement and use of the parts without departing from the spirit and scope of the invention as it will be understood by those skilled in the art. In particular, while the invention has been shown as applied to the operation of indicating means, and has special and unexpected advantages in this field, certain features may be employed for other purposes, and in particular the actuation of other types of apparatus responsive to phase shifts and voltage changes in amplitude or polarity of the type produced by this invention as herein disclosed.

I claim:

1. A signal transmission system for directional signals, comprising an A. C. source, a first resolver including a stator having a winding energized from said source and a rotor having two windings at right angles, the rotor being positioned in accordance with the direction of received signals; a second resolver including a rotor arranged for positioning in accordance with a selected direction and having two windings at right angles, each connected in series with a rotor winding of the first resolver, and a stator having two windings at right angles, connected to each other at one end; a first output circuit between the unconnected ends of the second resolver stator windings, including means responsive to the difference in potential in the latter ends, corresponding to the difference in the angular position of said two rotors; an impedance across said unconnected ends; a second output circuit between the connected ends of the second resolver stator windings and an intermediate point in said impedance, and phase-responsive means in said second circuit, arranged to indicate the sense of said received signals.

2. A signal transmission system for directional signals, comprising an A. C. source, a first resolver including a stator having a winding energized from said source and a rotor having two windings at right angles, positioned in accordance with the direction of received signals; a second resolver including a rotor arranged for positioning in accordance with a selected direction and having two windings at right angles, each connected in series with a rotor winding of the first resolver, and a stator having two windings at right angles, connected to each other at one end; a first output circuit between the unconnected ends of the second resolver stator windings, including means responsive to the difference in potential in the latter ends, corresponding to the difference in the angular position of said two rotors; an impedance across said unconnected ends; a second output circuit between the connected ends of the second resolver stator windings and an intermediate point in said impedance, and phase-responsive means in said second circuit, arranged to indicate the sense of said received signals, said phase responsive means comprising a reference circuit energized from said A. C. source, a rectifier system in the latter circuit, including two rectifiers connected in parallel in opposite senses, a feed connection between said second circuit and the input of one of said rectifiers, and a polarity responsive element connected to the output of both rectifiers.

3. A signal transmission system comprising a first rotary transformer including a stator section and a rotor section, one section having a winding adapted for energizing by alternating current, the other section having two windings at right angles; a second rotary transformer including a stator section and a rotor section, each having two windings at right angles; circuits connecting each winding of said other first transformer section with a corresponding winding of a section of the second transformer in series, and two output circuits connected to the windings of the other section of the second transformer, including a first output circuit connected across the latter windings in series, and a second output circuit connected across the latter windings in parallel.

4. A signal transmission system comprising a first resolver having a stator section and a rotor section, one section being energized from an A. C. source, the other section having two windings at right angles; a second resolver having a stator section and a rotor section, each section having two windings at right angles; circuits connecting each winding of the latter first resolver section with a winding of a second resolver section in series, and two output circuits connected to the windings of the other second resolver section, including a first output circuit connected across the latter windings in series, energized from said source and including voltage-responsive means, and a second output circuit connected across the latter windings in parallel, energized from said source and including polarity-responsive means.

5. A signal transmission system comprising a rotary transformer including a stator section and a rotor section, one section having a winding adapted for energizing by alternating current, the other section having two windings at right angles and two output circuits, one connected across said two windings in series, the other connected across said two windings in parallel, the arrangement being such that the induced voltages from said two windings in the output circuits are in quadrature; voltage-responsive means in the first circuit, and voltage-responsive means in the second circuit.

6. A signal transmission system comprising a resolver having a stator section and a rotor section, one section having a winding energized by alternating current, the other section having two windings at right angles, connected to each other at one end; a first output circuit between the unconnected ends of said windings, arranged to receive the voltages across said windings in series; an impedance across said unconnected ends; and a second output circuit between said connected ends of the windings and an intermediate point in said impedance, arranged to receive the voltages across said windings in parallel, in quadrature with the voltages in the first circuit.

7. A signal transmission system comprising a rotary transformer including a stator section and a rotor section, one section having a winding adapted for energizing by alternating current, the other section having two windings at right angles and two output circuits, one connected across said two windings in series, the other connected across said two windings in parallel, the arrangement being such that the induced voltages from said two windings in the output circuits are in quadrature; means in one circuit responsive to voltage amplitude, and means in the other circuit responsive to voltage polarity.

8. A signal transmission system comprising a rotary transformer including a stator section and a rotor section, one section having a winding adapted for energizing by alternating current, the other section having two windings at right angles and two output circuits, one connected across said two windings in parallel, the arrangement being such that the induced voltages from said two windings in the output circuits are in quadrature; voltage-responsive means in one circuit, including rectifying means and means responsive to the voltage of the rectifying means output, and voltage-responsive means in the other circuit, including rectifying means and means responsive to the polarity of the output of the latter rectifying means.

9. A signal transmission system comprising an A. C. source, a resolver having a stator section and a rotor section, one section having a winding energized by alternating current from said source, the other section having two windings at right angles, connected to each other at one end; a first output circuit between the unconnected ends of said windings, arranged to receive the voltages across said windings in series; an impedance across said unconnected ends; and a second output circuit between said connected ends of the windings and an intermediate point in said impedance, arranged to receive the voltages across said windings in parallel, in quadrature with the voltages in the first circuit, a reference circuit connected across said A. C. source and to the second circuit, arranged to combine the outputs of said source and second circuit, and a unit connected to the second circuit and responsive to the algebraic sum of said outputs.

10. A signal transmission system comprising an A. C. source, a resolver having a stator section and a rotor section, one section having a winding energized by alternating current from said source, the other section having two windings at right angles, connected to each other at one end; a first output circuit between the unconnected ends of said windings, arranged to receive the voltages across said windings in series; an impedance across said unconnected ends; and a second output circuit between said connected ends of the windings and an intermediate point in said impedance, arranged to receive the voltages across said windings in parallel, in quadrature with the voltages in the first circuit, a reference circuit connected across said A. C. source and to the second circuit, arranged to combine the outputs of said source and second circuit, and a unit responsive to the algebraic sum of said outputs, said responsive unit comprising a rectifier system, including two rectifiers connected in parallel in opposite senses, the input of one rectifier being connected to said second circuit; and a polarity responsive device connected to the output of said rectifier system.

11. A signal transmission system, comprising an A. C. source, a first resolver including a stator having a winding energized from said source and a rotor having two windings at right angles; a second resolver including a rotor having two windings at right angles, each connected in series with a corresponding rotor winding of the first resolver, and a stator having two windings at right angles, connected to each other at one end; a first output circuit between the unconnected ends of the latter windings, arranged to receive the voltages across said windings in series; an impedance across said unconnected ends; and a second output circuit having terminals at the connected ends of the latter windings and at an intermediate point in said impedance, arranged to receive the voltages across said windings in parallel, in quadrature with the voltages in the first circuit.

12. A signal transmission system, comprising an A. C. source, a first resolver including a stator having a winding energized from said source and a rotor having two windings at right angles; a second resolver including a rotor having two windings at right angles, each connected in series with a corresponding rotor winding of the first resolver, and a stator having two windings at right angles, connected to each other at one end; a first output circuit between the unconnected ends of the latter windings, arranged to receive the voltages across said windings in series; an impedance across said unconnected ends; and a second output circuit having terminals at the connected ends of the latter windings and at an intermediate point in said impedance, arranged to receive the voltages across said windings in parallel, in quadrature with the voltages in the first circuit, a voltage responsive unit in the first circuit, and a phase responsive unit in the second circuit.

13. A signal transmission system, comprising an A. C. source, a first resolver including a stator having a winding energized from said source and a rotor having two windings at right angles; a second resolver including a rotor having two windings at right angles, each connected in series with a corresponding rotor winding of the first resolver, and a stator having two windings at right angles, connected to each other at one end; a first output circuit between the unconnected ends of the latter windings, arranged to receive the voltages across said windings in series; an impedance across said unconnected ends; and a second output circuit having terminals at the connected ends of the latter windings and at an intermediate point in said impedance, arranged to receive voltages across said windings in parallel, in quadrature with the voltage in the first circuit, and a phase responsive unit connected to the second circuit, comprising a reference circuit connected across said source and to said second circuit, arranged to combine the outputs of said source and second circuit, a rectifying unit for a said combined output, and a polarity responsive device connected to the rectifying unit output.

14. A signal transmission system, comprising an A. C. source, a first resolver including a stator having a winding energized from said source and a rotor having two windings at right angles; a second resolver including a rotor having two windings at right angles, each connected in series with a corresponding rotor winding of the first resolver, and a stator having two windings at right angles, connected to each other at one end; a first output circuit between the unconnected ends of the latter windings, arranged to receive the voltages across said windings in series; an impedance across said unconnected ends; and a second output circuit having terminals at the connected ends of the latter windings and at an intermediate point in said impedance, arranged to receive the voltages across said windings in parallel, in quadrature with the voltages in the first circuit, and a phase responsive unit connected to the second circuit, said first circuit including two rectifiers, each effectively in series with one of said unconnected stator winding ends, and an element responsive to voltage and polarity connected across the outputs of said rectifiers.

References Cited in the file of this patent

UNITED STATES PATENTS

| | | |
|---|---|---|
| 2,405,568 | Ferrill, Jr. | Aug. 13, 1946 |
| 2,420,193 | Rich | May 6, 1947 |
| 2,612,547 | Johnstone et al. | Sept. 30, 1952 |